US006711006B2

United States Patent
Chen

(10) Patent No.: US 6,711,006 B2
(45) Date of Patent: Mar. 23, 2004

(54) ASSEMBLING STRUCTURE FOR PERIPHERAL ACCESSORIES OF PORTABLE COMPUTER

(76) Inventor: Chung-Yang M. Chen, 3F, No. 2, Lane 497, Chung-Cheng Rd., Hsintien City, Taipei County (TW)

( * ) Notice: Subject to any disclaimer, the term of this patent is extended or adjusted under 35 U.S.C. 154(b) by 130 days.

(21) Appl. No.: 10/066,577

(22) Filed: Feb. 6, 2002

(65) Prior Publication Data

US 2003/0147206 A1 Aug. 7, 2003

(51) Int. Cl.[7] .............................................. G06F 1/16
(52) U.S. Cl. ................... 361/683; 361/679; 248/231.31; 362/191
(58) Field of Search ................................. 361/681, 683, 361/679, 687; 362/190, 191, 98, 413, 418, 99, 419, 421, 427, 630, 368, 369; 248/231.31, 187.1, 918, 229.11, 222.13, 292.12, 292.14, 178.1, 214, 220.22, 224.8, 674, 675, 689–692; 364/708.1; 379/446; 224/249, 556, 564, 673, 267, 408; 348/373, 552, 375, 376

(56) References Cited

U.S. PATENT DOCUMENTS 5,103,384 A * 4/1992 Drohan ....................... 362/191
5,379,201 A * 1/1995 Friedman .................... 362/191
5,619,395 A * 4/1997 McBride ..................... 361/683
5,855,343 A * 1/1999 Krekelberg .................. 248/121
6,222,501 B1 * 4/2001 Yajima et al. ............... 343/878
6,239,841 B1 * 5/2001 Verstockt et al. ........... 348/373
6,481,681 B1 * 11/2002 Stunkel et al. .......... 248/231.31
6,591,001 B1 * 7/2003 Oda et al. ................... 382/117

FOREIGN PATENT DOCUMENTS

JP    410136241 A  *  5/1998  .......... H04N/5/225
JP    411153832 A  *  6/1999  .......... G03B/17/56
JP    411284882 A  * 10/1999  .......... H04N/5/222

* cited by examiner

Primary Examiner—Michael Datskovsky
(74) Attorney, Agent, or Firm—Troxell Law Office PLLC

(57) ABSTRACT

Assembling structure for peripheral accessories of portable computer, including a clamping section and a preset electric apparatus. The clamping section includes a first board member, a second board member and a resilient bridge section connected between the first and second board members. At least one ball seat is disposed on the second board member for jointing the clamping section with the preset electric apparatus such as a light and a monitor with a joint ball. The first board member is longer than the second board member. The first and second board members are slightly inward oppositely inclined to define an opening therebetween. Any portion of the panel of the portable computer can be clamped in the opening so as to mount the electric apparatus on the portable computer.

10 Claims, 4 Drawing Sheets

ASSEMBLING STRUCTURE FOR PERIPHERAL ACCESSORIES OF PORTABLE COMPUTER

BACKGROUND OF THE INVENTION

The present invention is related to an assembling structure for peripheral accessories of portable computer, by which peripheral accessories of the portable computer can be simply jointed thereon.

Portable computers are widely used in various fields. However, there are still some inconveniences existing in some situations of use of the portable computers. For example, in a dim or dark place such as a compartment and a bedroom, a user can hardly have a clear vision and may key in wrong characters. Moreover, after a period of use, the user's eyes will feel very tired.

Taiwanese Patent Publication No. 296812 discloses a computer light free from external power supply. The light serves as a peripheral equipment of a portable computer, including a plug connectable with the portable computer, a flexible support rod connected with the plug and a projecting section mounted at top end of the support rod. In a dim place, the light provides sufficient illumination for a user to clearly see the panel and the keys of the portable computer.

However, the above computer light still has some shortcomings as follows:

1. It is uneasy to store the computer light. The support rod has a fixed length. When not used, it is necessary wind the support rod for storage. Such procedure is troublesome and the support rod will occupy much room.
2. The computer light is not durable. The plug is fixedly connected with the support rod. After frequently wound and unwound, the inbuilt wires may disconnect from the electric contact of the plug.
3. It is impossible to expand the computer light. The support rod is fixedly connected with the projecting lamp so that other peripheral equipment such as a camera and a microphone cannot be further assembled with the support rod. Accordingly, when it is desired to assemble other electric equipment with the portable computer, it is necessary to detach the computer light from the portable computer and then connect the electric equipment with the portable computer. Such procedure is quite inconvenient.

SUMMARY OF THE INVENTION

It is therefore a primary object of the present invention to provide an assembling structure for peripheral accessories of portable computer, by which various peripheral accessories of the portable computer can be simply jointed on a rim of the panel of the portable computer.

According to the above object, the assembling structure for peripheral accessories of portable computer of the present invention includes a clamping section and a preset electric apparatus. The clamping section includes a first slat-like board member, a substantially L-shaped second board member and a resilient bridge section connected between the first and second board members. At least one ball seat is disposed on second board member. The preset electric apparatus such as a light and a monitor has a joint ball corresponding to the ball seat, whereby the preset electric apparatus can be jointed on the clamping section. The first board member is longer than the second board member. The bridge section is bighted and the first and second board members are inward oppositely inclined to define an opening therebetween. The resilient bridge section enables the first and second board members to resiliently clamp a rim of the panel of the portable computer so as to simply mount the electric apparatus on the portable computer.

Two opposite inner edges of the bridge section are formed with two ribs at the adjoining sections between the bridge section and the first and second board members are respectively formed with two ribs. After the rim of the panel is fitted into the opening of the clamping section, the two ribs respectively abut against top face and back face of the rim. Therefore, the rim is more firmly inlaid and clamped by the clamping section.

A free end of the second board member is formed with a slightly outward arched section opposite to the opening. When the rim is inserted into the opening, the arched face of the arched section can easily slide over the rim to smoothly stretch open the opening. Accordingly, the rim can be easily inlaid into the clamping section.

The present invention can be best understood through the following description and accompanying drawings wherein:

DETAILED DESCRIPTION OF THE PREFERRED EMBODIMENTS

Figure 1:
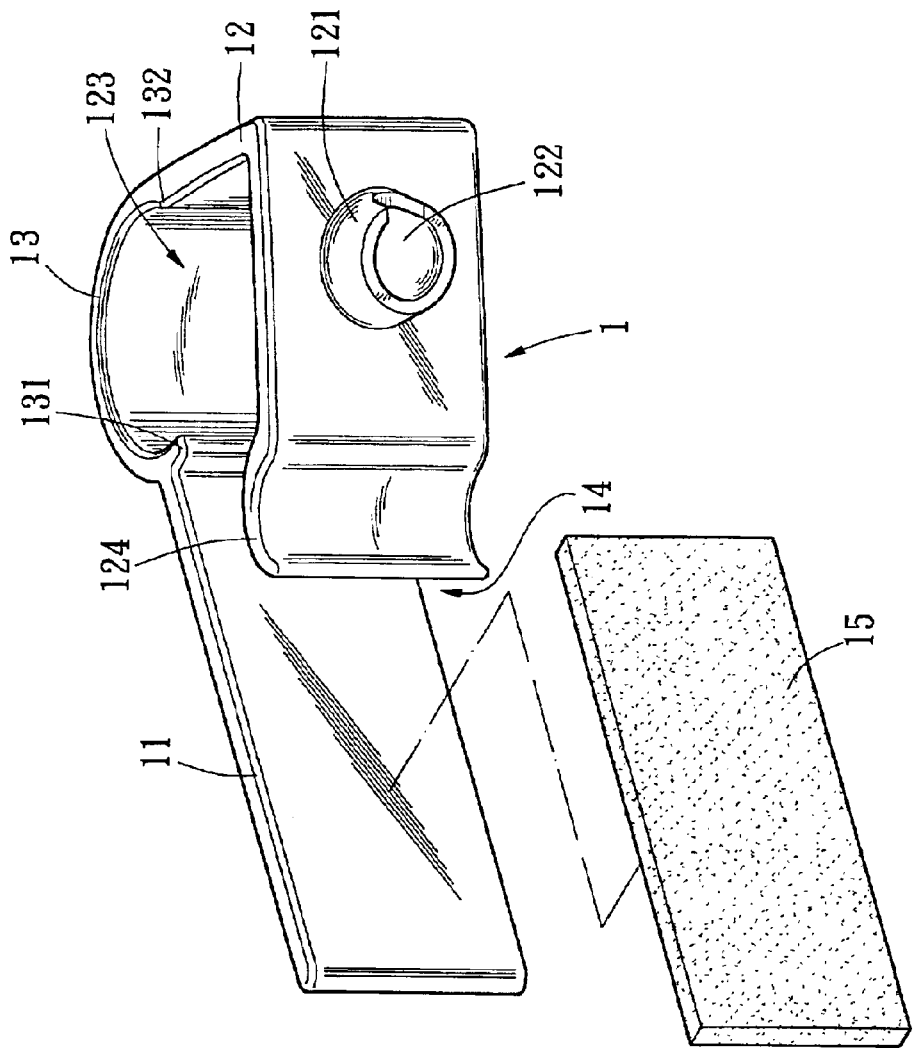
FIG. 1 is a perspective view of the clamping section of the present invention.

Please refer to FIG. 1. The assembling structure for peripheral accessories of portable computer of the present invention includes a clamping section 1 and a preset electric apparatus 2. The clamping section 1 includes a first board member 11, a second board member 12 and a bridge section 13 connected between the first and second board members 11, 12. At least one ball seat 121 is disposed on outer face of the second board member 12. The ball seat 121 has a form of a basin. The ball seat 121 is formed with a central joint socket 122.

Figure 3:
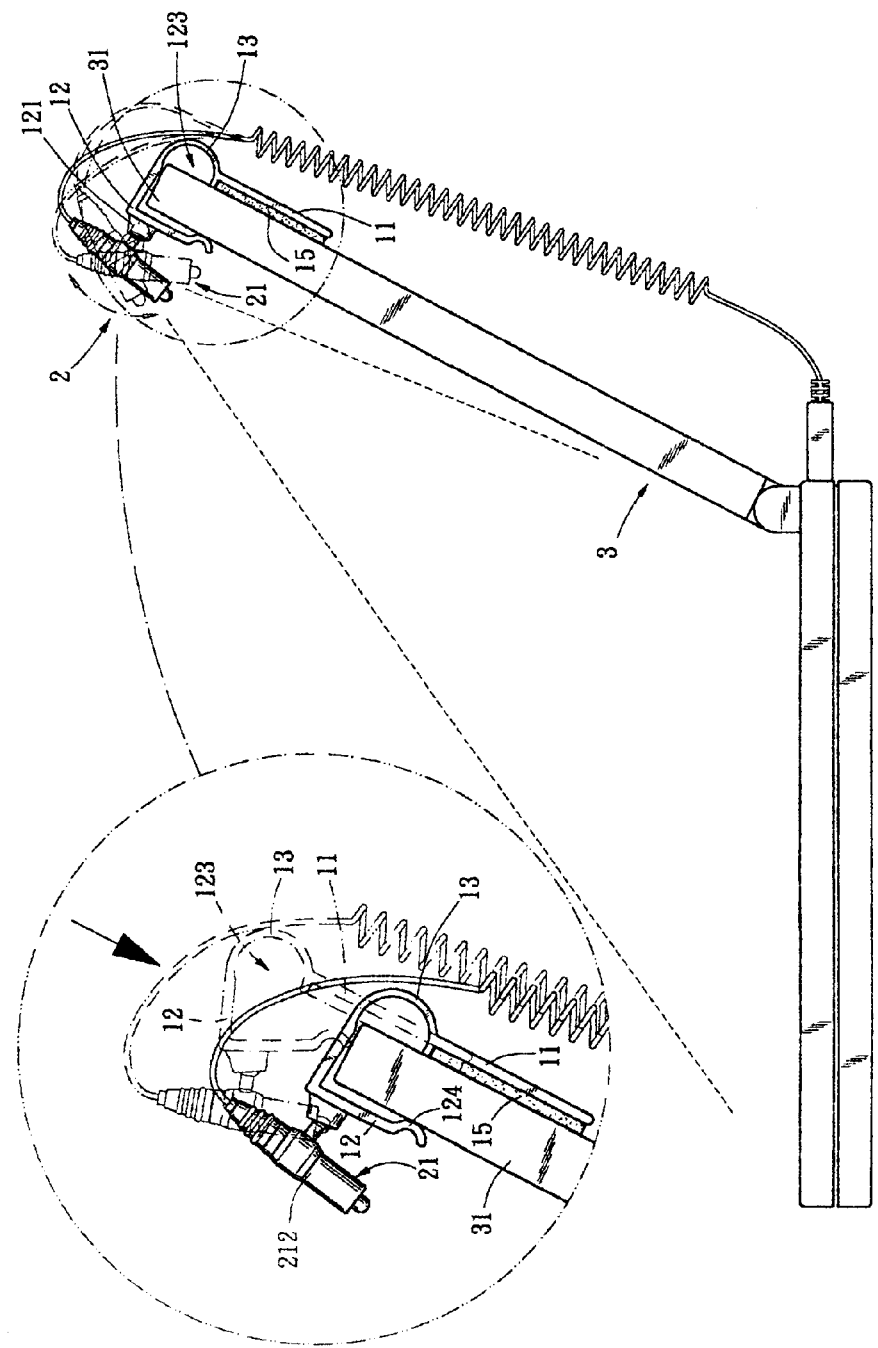
FIG. 3 is a side assembled view according to FIG. 2, showing the application of the present invention to the portable computer.
Figure 4:
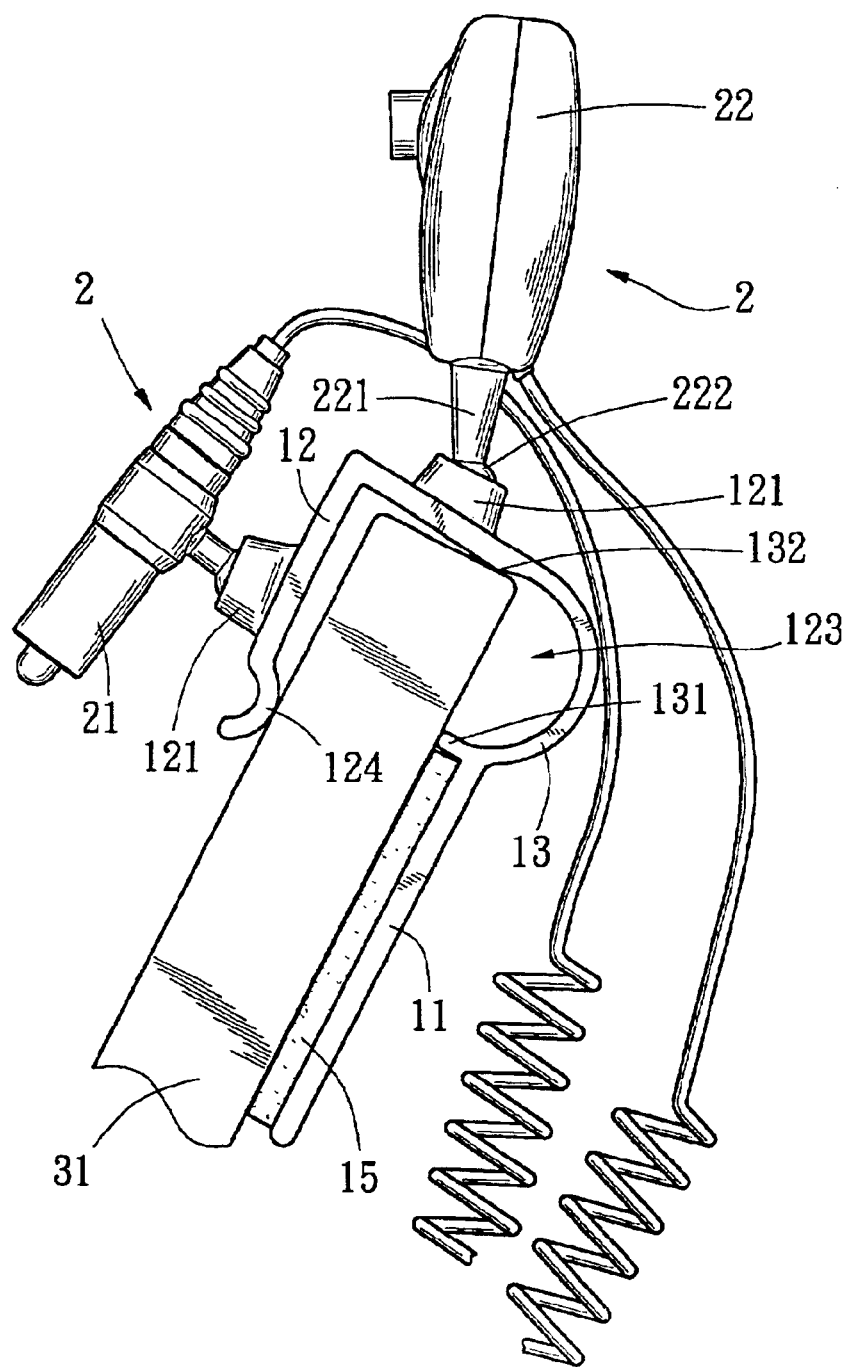
FIG. 4 shows another embodiment of the present invention.

The preset electric apparatus 2 can be a peripheral electric apparatus such as a light 21 or a monitor 22 (as shown in FIGS. 3 and 4). The electric apparatus 2 has a joint ball 211 (221) corresponding to the joint socket 122 of the ball seat 121, whereby the electric apparatus 2 can be jointed on the clamping section 1 and universally revolved and adjusted in position.

In a preferred embodiment, the first board member 11 is an elongated slat, while the second board member 12 is an L-shaped plate member. The bridge section 13 is integrally connected the first and second board members 11, 12. The first board member 11 has a length longer than the extending length of the second board member 12.

The bridge section 13 is bighted and has a certain resilience. The two board members 11, 12 inward obliquely extend opposite to each other to define an opening 14 between the two board members 11, 12. The opening 14 permits the first and second board members 11, 12 and the bridge section 13 to resiliently clamp an object.

Two opposite inner edges of the bridge section 13 are formed with two ribs 131, 132 at the adjoining sections between the bridge section 13 and the first and second board members 11, 12. After the rim 31 of a panel 3 is fitted into the opening 14 of the clamping section 1, the two ribs 131, 132 respectively abut against top face and back face of the rim 31. Therefore, the rim 31 of the panel 3 is more firmly inlaid and clamped in the clamping space 123 of the clamping section 1 inward extending from the opening 14 thereof (as shown in FIG. 3).

A free end of the second board member 12 is formed with a slightly outward arched section 124 opposite to the opening 14. When the rim 31 is inserted into the opening 14, the arched face of the arched section 124 can easily slide over and abut against the corner of the rim 31 to smoothly stretch open the opening 14. Accordingly, the rim 31 can be easily inlaid into the clamping section 1.

A buffing pad 15 is disposed on the inner face of the first board member 11 extending from the rib 131 to free end of the first board member 11. When the rim 31 of the panel 3 is clamped by the clamping section 1, the buffing pad 15 provides a damping effect between the first board member 11 and a lateral wall of the rim 31 to avoid slippage.

Figure 2:
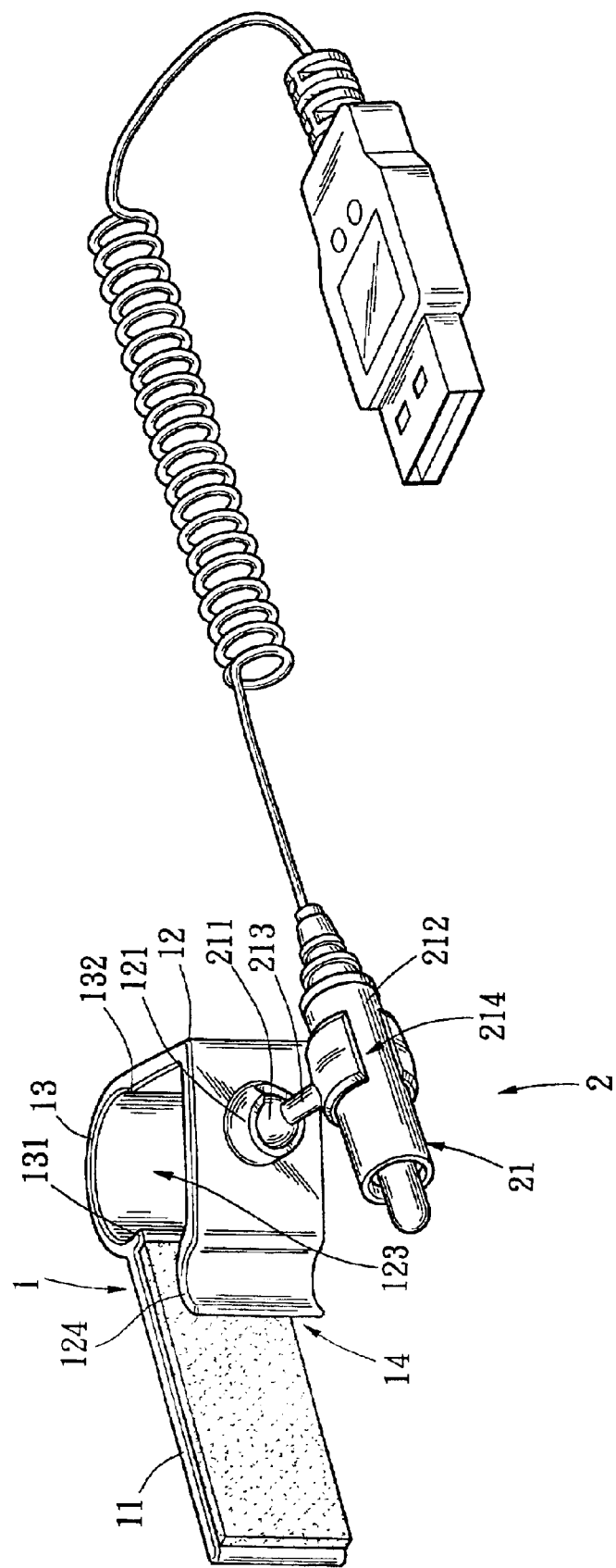
FIG. 2 is a perspective view of the clamping section and the light of the present invention.

Referring to FIGS. 2 and 3, the light 21 is composed of a lamp seat 212 and a support rod 213. The joint ball 211 and a clip 214 are respectively disposed at two ends of the support rod 213. The joint ball 211 is held in the ball seat 121 to form a universal joint. The lamp seat 212 is clipped by the clip 214.

Referring to FIG. 3, through the opening 14 of the clamping section 1, the upper rim 31 of the panel 3 is inlaid and clamped by the board members 11, 12 of the clamping section 1. Under such circumstance, the bridge section 13 provides a resilient buffing effect for the board members 11, 12 to properly clamp the rim 31. The two ribs 131, 132 abut against the rim 31 to more firmly clamp the rim 31. After the clamping section 1 clamps the panel 3, the support rod 213 clipping the lamp seat 212 can be revolved to adjust the lighting angle of the light 21.

Referring to FIG. 4, in addition, a ball seat 121 can be disposed on the surface of top side of the second board member 12. A support rod 221 is disposed on a monitor 22. A joint ball 222 is disposed at free end of the support rod 221. The joint ball 222 is held in the ball seat 121 to joint the monitor 22 on the second board member 12. Accordingly, by means of the clamping section 1, the monitor 22 can be mounted on the upper rim 31 of the panel 3 for operating video signal of multimedia. According to the above arrangement, by means of the clamping section 1 of the present invention, peripheral electric apparatus such as a light 21 and a monitor 22 can be simply mounted on the portable computer.

The above embodiments are only used to illustrate the present invention, not intended to limit the scope thereof. Many modifications of the above embodiments can be made without departing from the spirit of the present invention.

What is claimed is:

1. An assembling structure for peripheral accessories of a portable computer comprising:

a) a first board member;

b) a second board member having an L-shape, the first board member being longer than the second board member;

c) a resilient bridge section having a curved shape, and a first bridge end and a second bridge end, the first bridge end connected to a first end of the first board member and the second bridge end connected to a first end of the second board member, the first board member and the second board member being spaced apart by the curved bridge section and moveable between an un-clamped position and a clamped position; and d) at least one ball seat having a central joint socket and extending from an exterior side of the second board member.

2. The assembling structure according to claim 1, wherein the first board member, the bridge section, and the second board member are integrally made.

3. The assembling structure according to claim 1, further comprising an arched section located on a second end of the second board member.

4. The assembling structure according to claim 1, further comprising a buffing pad connected to a side of the first board member, such that the buffing pad is positioned between the first and second board members.

5. The assembling structure according to claim 1, further comprising a first and a second rib located between the first and the second board members, the first rib being formed on the first end of the first board member and the second rib being formed on the first end of the second board member.

6. The assembling structure according to claim 1, further comprising at least one electrical apparatus having a support rod connected to a joint ball, the joint ball being pivotally and rotatably connected to the central joint socket of the at least one ball seat.

7. The assembling structure according to claim 6, wherein each of the at least one electric apparatus is selected from the group of electric apparatuses consisting of a light and a monitor.

8. The assembling structure according to claim 7, wherein electrical apparatus comprises a light and wherein the light includes a lamp seat and a clip, the clip is connected to the support rod on an end opposite the joint ball and removably connected to the lamp seat.

9. The assembling structure according to claim 1, wherein the at least one ball seat includes two ball seats.

10. The assembling structure according to claim 9, further comprising two electric apparatuses, each of the two electric apparatuses have a support rod connected to a joint ball, one joint ball being pivotally and rotatably connected to each central joint socket of each of the two ball seats.

* * * * *